United States Patent [19]

Mitchell et al.

[11] 4,317,839

[45] Mar. 2, 1982

[54] TAFFY-LIKE CONFECTION COMPOSITION

[75] Inventors: William A. Mitchell, Lincoln Park, N.J.; Gerald S. Wasserman, Spring Valley, N.Y.; Alfred C. Glatz, Stamford, Conn.

[73] Assignee: General Foods Corporation, White Plains, N.Y.

[21] Appl. No.: 133,165

[22] Filed: Mar. 24, 1980

[51] Int. Cl.³ .............................................. A23G 3/00
[52] U.S. Cl. .................................... 426/96; 426/103; 426/306; 426/307; 426/660
[58] Field of Search ................ 426/660, 804, 103, 96, 426/654, 306, 302, 307

[56] References Cited

U.S. PATENT DOCUMENTS

| | | | |
|---|---|---|---|
| 3,985,910 | 10/1976 | Kirkpatrick | 426/660 |
| 4,001,457 | 1/1977 | Hegadorn | 426/660 |
| 4,117,176 | 9/1978 | Taylor | 426/660 |
| 4,150,161 | 4/1979 | Rudolph et al. | 426/660 |
| 4,153,732 | 5/1979 | Muhler | 426/660 |

*Primary Examiner*—Jeanette M. Hunter
*Attorney, Agent, or Firm*—Daniel J. Donovan; Bruno P. Struzzi; Thomas R. Savoie

[57] ABSTRACT

A taffy-like confection is prepared from an admixture of a sugar melt having at least 40% fructose and a surface active agent. The confection contains granulated gasified candy suspended therein.

19 Claims, No Drawings

TAFFY-LIKE CONFECTION COMPOSITION

BACKGROUND OF THE INVENTION

1. Field of the Invention

This invention relates to a confection composition. More particularly, it relates to a taffy-like confection composition containing fructose and a surface active agent. This invention especially relates to a confection composition of gasified candy dispersed in a binding matrix containing fructose and a surface active agent.

2. Description of the Prior Art

Gasified candy is a hard candy containing gas, such as carbon dioxide, as disclosed in U.S. Pat. Nos. 3,012,893 of Kremzner and Mitchell, 3,985,909 and 3,985,910 of Kirkpatrick and 4,001,457 of Hegadorn which are incorporated herein by reference. Such a candy is made by a process which comprises melting crystalline sugar, contacting such sugar with gas at a pressure of 50 to 1,000 psig for a time sufficient to permit incorporation in said sugar of 0.5 to 15 cm$^3$ of gas per gram of sugar, maintaining the temperature of said sugar during said incorporation above the solidification temperature of the melted sugar, and cooling said sugar under pressure to produce a solid amorphous sugar containing the gas. Upon the release of the pressure, the solid gasified candy fractures into granules of assorted sizes.

The resultant product contains 1% to 4% water and most typically 2% go 3% water by weight of the total composition. (All figures expressed herein as a percentage are in terms of weight percent, unless specifically expressed to the contrary.) Lower levels of moisture are not practicably obtainable because the additional heat necessary to drive off the water causes the candy melt to carmalize or burn, resulting in an off-flavor, undesirable product. High moisture levels result in a soft, sticky matrix which rapidly liberates the entrapped gas and is thus not storage stable. Further, gasified candy does not remain stable at temperatures above about 110° F.

The gasified candy, when placed in the mouth, produces an entertaining but short-lived popping sensation. As the candy is wetted in the mouth the candy melts and the gas escapes. The tingling effect in the mouth is sensational but short.

When the solidified gasified candy is fractured by the release of pressure from the preparation vessel or a cooling tube, provided for that purpose, the resultant granulated pieces are irregular, randomed-sized pieces having the appearance of pieces of broken glass or what might be termed sharp-faced pieces of gravel. The granulated pieces are sieved to provide the gasified candy in a range of particle sizes.

Copending applications are the assignee herein describe a variety of confection compositions containing gasified candy. In application Ser. No. 088,720 the gasified candy is prepared in a controlled shape by deposit or injection molding, while in application Ser. No. 088,481 tableting of the gasified candy is disclosed. Application Ser. No. 088,482 describes a hard candy prepared by dispersing gasified candy in a matrix of sorbitol. A chewable form of gasified candy wherein oleaginous materials are employed to bind and enrobe gasified candy is described in application Ser. Nos. 088,483 and Ser. No. 124,029. A low temperature preparation of enrobed gasified candy is described in application Ser. No. 129,513. Several apparatus and processes are described in application Ser. Nos. 88,485 and 88,510.

Binder materials for coating or enrobing gasified candy must be liquid or plastic at temperatures which do not adversely affect the gasified candy when the materials are admixed. Most low-moisture sugar systems harden at too high a temperature to be useful in formulating admixtures with gasified candy. For example, sugar melts, high in fructose, become hard and brittle when cooled to about 135° F. For combining a fructose melt with gasified candy, temperatures above that level would be required. Such working temperatures would be completely unsatisfactory regarding the stability of the gasified candy.

It is an object of this invention to provide confection compositions having a taffy-like consistency.

It is an object of this invention to provide a taffy-like candy containing gasified candy.

It is another object of this invention to provide gasified candy in a coated form which will not require moisture resistant packaging.

SUMMARY OF THE INVENTION

In accordance with the present invention a sugar melt consisting primarily of fructose and containing a surface active agent provides a taffy-like confection. More particularly this sugar melt is a confection composition comprising an admixture of (a) a sugar comprising at least 40% fructose and (b) an amount of surface active agent effective to lower the working temperature of the admixture to below 120° F., said admixture having a moisture content of below 5%. As used herein, "working temperature" of a sugar melt or admixture containing substantial quantities of sugar is a temperature at which the sugar melt or sugar admixture is sufficiently plastic or flowable to permit the incorporation therein by means of "folding-in," kneading or enrobing of an edible material, such as gasified candy.

In another aspect of this invention this confection serves as a binding matrix for enrobing edible material. By enrobing a gasified candy, a firm predetermined shaped piece may be formed from random sized particles of gasified candy to provide a gasified candy confection in a chewable taffy-like base.

Briefly, the gasified candy confection consists of granulated gasified candy suspended in a binding matrix containing fructose plus a surface active agent. More particularly, this invention relates to a protected composition comprising edible material dispersed in a binding matrix comprising an admixture of (a) a sugar comprising at least 40% fructose and (b) an amount of a surface active agent effective to lower the working temperature of the admixture to below 120° F., said admixture having a moisture content of below 5%.

This invention also relates to a method of preparing this protected composition which comprises (a) cooling to below 120° F. a liquid admixture of a sugar comprising at least 40% fructose and an amount of a surface active agent effective to lower the working temperature of the admixture to below 120° F. to produce a viscous matrix having a moisture content of below 5%, (b) combining edible material with said viscous matrix whereby the edible material is enrobed, and (c) forming discrete pieces of protected enrobed edible material.

DESCRIPTION OF THE PREFERRED EMBODIMENTS

Broadly, this invention relates to a protected composition comprising edible material enrobed with or suspended in a binding matrix containing fructose and a surface active agent. This matrix provides protection for such edible materials as gasified candy, vitamins, fruits, nuts, flavorings and the like.

In one of its preferred embodiments the present invention relates to a confection comprising gasified candy in discrete pieces which provides a chewable candy that produces a sizzling effect when eaten. By enrobing the gasified candy, a predetermined shaped piece is formed from random sized particles of gasified candy. These pieces are resistant to moisture but a further coating or protective package may be used to provide better storage stability.

Briefly the confection consists of granulated gasified candy suspended in a binding matrix containing fructose and a surface active agent.

Optionally, a final coat of edible shellac or varnish, colored if desired, may be applied to the confection to improve its moisture resistance. Alternately, a final coating of sugar, either in hard or powdered form, may be applied to the outer surface of the carbonated candy. This sugary coating can be colored if desired. In addition or alternately, a polished waxy coating of, for example, beeswax or carnauba wax may be applied to the outer surface of the discrete piece of confection. In another embodiment a final coat of an oleaginous material may be formed as an enrobant for the confection.

The taffy-like matrix is composed of a sugar melt having a high fructose content together with a surface active agent. This combination is unusual in that at low moisture levels, i.e. less than 5.0% and temperatures below 120° F., it is workable enough to permit the incorporation therein of substantial quantities of gasified candy. Following the incorporation of the gasified candy into the taffy-like matrix, the resultant confection is permitted to set at room temperature.

The gasified candy component of the instant confection is a hard sugar product having bubbles of gas entrapped therein and is conveniently produced according to the processes disclosed in U.S. Pat. Nos. 3,012,893, 3,985,909, 3,985,910 and 4,001,457 and discussed hereinbefore. The gasified candy can be prepared from any of the commercially-available sugars employed in the confectionary industry. Thus, such sugars as glucose, fructose, sucrose, lactose, corn syrup, and the like, alone or in combination may be employed in practicing the instant invention. A combination of sucrose and lactose provides a preferred product. A mixture of sucrose with corn syrup (containing glucose, maltose, dextrin) is also satisfactory. A mixture of sucrose, lactose and corn syrup in a weight ratio of 52:27:21 is particularly preferred, providing an excellent gasified hard product particularly characterized by its good gas retention and reduced stickiness on standing. A 40:40:20 mixture of sucrose, lactose and corn syrup is especially preferred since it additionally provides good high temperature stability and can withstand significantly higher pressures if formed into tablets than the 52:27:21 formulation. The moisture content of the gasified candy is typically between about 1.0 and about 5.0%. Preferably, it is between about 2.0 and about 3.0%.

The gases used to prepare the gasified candy of the present invention may be any of the commonly-available gases which are substantially unreactive with the sugar or sugars being employed and include such gases as, carbon dioxide, nitrogen or air but carbon dioxide is preferred. The gasified candy contains 0.5 to 15, preferably 2 to 7, cm$^3$ of gas per gram of candy.

Coloring, flavoring and/or active ingredients may be incorporated in the gasified candy to enhance the eye appeal of the confection and to provide a pleasing taste to complement the sizzling effect of the gasified candy. Commercial colorings are available in a variety of hues for incorporation into foodstuffs and may be employed in this invention. The choise will be dependent on the desired effect and, possible, the flavoring, if any, to be incorporated into the confection. Flavors such as wintergreen, spearmint, peppermint, birch, anise and such fruit flavors as cherry, lemon-lime, orange, grape, etc. and mixtures thereof and the like may be used satisfactorily with the confection of the present invention and are available commercially. Active ingredients are also available for incorporation in the confection to provide a product useful as a breath freshener, cough drops and the like. The amount of coloring, flavoring and/or active ingredient used will vary depending on the type used, individual taste preferences, the specific gasified candy employed and other considerations well known to those skilled in the confectionary art. Preferably, these ingredients are added to the sugary melt after the desired moisture level is obtained by evaporation of the melt, under vacuum.

The gasified candy is employed in finely divided form and is most easily provided in that form following the solidification of the gasified sugar in the preparation vessel or in a separate cooling tube provided for that purpose. The sudden release of pressure from the vessel, fractures the gasified sugar into granulated pieces in a wide range of assorted sizes. Although finely divided pieces of gasified candy in a variety of sizes may be employed in the invention, it is preferred that the pieces be sieved to provide uniform sized pieces. In general, smaller sized pieces are preferred. Gasified candy having a particle size distribution of $-4$ to $+40$ U.S. Sieve Series can be employed but $-14$ to $+40$ or $-14$ to $+30$ U.S. Sieve Series are preferred.

A sugarless form of gasified candy can also be employed in this invention by substituting sugarless material, such as sorbitol, for the sugar in the gasified candy preparation described herein.

The gasified candy may be prepared as follows:

The sugar or mixtures of sugars are placed in a closed, heated vessel provided with a mixer. A small quantity of water is added to dissolve the sugar and other additives. Heat is applied to the vessel sufficient to dissolve and melt the sugars. The mixture is then evaporated to produce a melt having about 1-5%, preferably about 2-3%, of water. The required amounts of coloring, flavoring and/or active ingredient are usually added when the desired water content is achieved. The evaporation may be conducted at atmospheric pressure or, preferably, under a vacuum of up to 15 inches of mercury. Melt temperatures of between about 280°-320° F. are usually necessary to reach the desired moisture content. Care must be exercised, of course, to prevent caramelizing the sugary mix.

The sugar melt is gasified by introducing gas, preferably carbon dioxide, at superatmospheric temperature into the closed vessel. Pressures of about 50-1000 psig, preferably about 500-700 psig are utilized. While the required amount of gas is being introduced into the closed vessel, the liquid sugary melt is agitated to effect intimate contact between the gas and the melt. Sufficient gas is incorporated into the melt to provide 2 to 7 cc. of gas per gram of candy in the final product. The gasification is completed within a fairly short period of time. Usually less than about 10 minutes, normally 2 to 6 minutes, are sufficient. The required amount of mixing may be readily determined by those skilled in the art. For example, using a Parr bomb (a small pressure vessel equipped with a mixer) to prepare about 1,000 grams of melt, mixing speeds of 200–1500 rpm, preferable 500–900 rpm, have been found to be satisfactory.

The gasified melt is then permitted to solidify while maintaining the vessel under pressure. Where desired, the gasified melt may be transferred to a cooling tube for solidification as described in U.S. Pat. Nos. 3,985,910 and 4,001,457. Bubbles of gas are entrapped in the solidified sugar. After the melt has solidified, the pressure is suddenly released which fractures the sugary mass into granulated pieces of a variety of sizes.

The binding matrix of this invention contains a surface active agent and a sugar melt high in fructose. Fructose is a ketohexose and is also known as fruit sugar. It occurs naturally in a large number of fruits and in honey and is the sweetest of the common sugars. It has been found that sugar melts having a fructose content of above 40%, on a dry basis, and more particularly above 80%, on a dry basis, are useful in this invention. Other sugars such as glucose, sucrose, lactose and the like as well as polymeric carbohydrates may form the remaining portion of the sugar melt. A particularly preferred sugar syrup which may be used in the subject invention is commercially available from Clinton Corn Company as ISOMEROSE 900 in 80% concentration. The solids content of this syrup is about 90% (dry weight) fructose. Other syrups and mixtures having high fructose contents within the above limitations, may also be employed.

The surface active agent employed must be soluble in or dispersible in the sugar melt. It acts to lower the working temperature of the mixture. Sugar melts made from most sugar mixtures including those with a high fructose content when cooked to a moisture content of 5% and below will become hard and brittle when cooled to about 135° F. and below. However, when surface active agents are dissolved or dispersed in the fructose sugar melts in accordance with the present invention, the sugar melt remains plastic of flowable thereby making it possible to "fold-in" or enrobe moisture sensitive gasified candy with this fructose sugar melt. The surface active agent will plasticize and lower the viscosity of the high fructose sugar melts having moisture contents of about 2.5 to about 5.0% so that gasified candy may be incorporated into these taffy-like compositions at temperatures of about 120° F. down to about 80° F.

The surface active agents which may usefully be employed here are those used in food systems which are soluble in or can be dispersed in high fructose sugar melts. The useful surface agents must be capable of forming with the sugar melt an admixture which is workable at low temperatures, viz, 80°–120° F., preferably 95°–105° F. Preferably, they should be soluble surface active agents, such as stearoyl lactylates, lecithin and the like but, satisfactory results are obtained if the surface active agent employed is dispersible in the sugar melt. Sodium stearoyl-2-lactylate is a particularly preferred surface active agent and may be obtained as EMPLEX from PATCO Chemicals Division of C. J. Patterson, Kansas City, MO. Pure lecithin is a phosphatidyl choline, while commercial lecithin is a mixture of acetone-insoluble phosphatides. The lecithins are classified as phosphoglycerides or phosphatides.

Where desired, coloring, flavoring and/or active ingredients may be incorporated into the binding matrix as described hereinbefore regarding the gasified candy.

The combination of a high fructose sugar melt containing a surface active agent, such as sodium stearoyl-2-lactylate or lecithin, is unusual in that at a moisture level of less than 5% and temperatures below 120° F., it is workable enough to allow incorporation therein of edible materials such as gasified candy granules, producing a stable combination of a taffy-like confection and gasified candy. The sizzling, crackling effect produced by the gasified candy is prolonged because of its being combined with the chewy taffy-like matrix and this combination of sizzling and chewy texture provides an unusual and pleasant sensation to the candy lover.

For stability of the gasified candy, the moisture content of the binding matrix should be below 5% with a level of below 3.5% being preferred with about 2–3.0% being particularly preferred. Confection compositions of this invention can contain up to about 40% of gasified candy having a particle size of −4 to +40 U.S. Sieve Series with a gasified candy having a particle size of −14 to +40 to U.S. Sieve Series and a concentration of about 15 to about 30% being preferred for the best combination of organoleptic effects.

The surface active agent should be present in an amount which is effective to lower the working temperature of the binding matrix to below 120° F. and usually will constitute about 0.1 to about 5.0% of the binding matrix with about 0.5 to about 1.0% being preferred for sodium stearoyl-2-lactylate and about 0.5 to about 2.0% being preferred for lecithin.

Even without being combined with gasified candy, the low moisture binding matrix of high fructose syrup and surface active agent has a taffy-like consistency and provides a useful confection in its own right.

In a preferred embodiment, edible oil and condensed milk are combined with the taffy-like confection of this invention to provide texture and flavor characteristics similar to that of a caramel confection. Additionally, caramel flavoring may be supplied to more closely duplicate a caramel product. These additives permit the preparation of caramel-like confection while retaining the organoleptic effects of the gasified candy, taffy-like composition. Such edible oils as coconut, olive, peanut, corn, cottonseed, soybean, palm kernel oil and the like may be employed but palm kernel oil is preferred. Edible oil additions of about 2 to about 8, preferably about 3 to about 5% and condensed milk additions of about 2 to about 8, preferably about 3 to about 5% of the binder are useful in preparing these preferred embodiments.

The high fructose sugar melt usually constitutes about 85–99.9% of the binding matrix. It preferably comprises about 87–95% of those compositions containing edible oil and condensed milk and about 98–99.5% of those containing only the sugar melt and the emulsifier.

The taffy-like compositions of this invention may be prepared as follows:

High fructose corn syrup (Isomerose 900) and sodium stearoyl-2-lactylate are combined and heated to 335° F. and maintained at that temperature, preferably under vacuum until the moisture content is below 5%, preferably below 3.5%. The mixture is then cooled to about 120° F. on a sheet and, where desired, coloring, flavoring and/or active ingredient added. Gasified candy granules may then be incorporated into the fructose matrix by manually mixing. The gasified candy confection is then formed into pieces of desired shape and packaged in non-moisture proof materials.

One of the preferred formulations may be prepared as follows:

High fructose corn syrup, sodium stearoyl-2-lactylate, palm kernel oil and salt are combined and heated to 310° F. and held there, preferably under vacuum until the moisture content is below about 3½%. Condensed milk is added and the mixture is heated to 300° F. under vacuum until the moisture content is again below about 3½%. The sugar melt is cooled, the gasified candy is added and mixed and the product is packaged as described above.

In general, the temperature of the frustose sugar melt is held at about 280° to about 345° F. under vacuum (up to 15″ Hg) or about 325° to about 340° F. under atmospheric pressure until the desired moisture content is obtained. The fructose melt is typically cooled to below about 120° F., i.e. to about 80° to about 120° F., preferably about 95° to about 105° F., for best workability. It should be understood that these working temperatures are in reality "initial" working temperatures since the temperature of the matrix binder drops quickly once an edible material is added and worked into the binder. Thus, gasified candy can safely be worked into a binder having a working temperature slightly below 120° F. despite the usual stability limit of 110° F. for the gasified candy.

"Pulling" of the fructose matrix binder as is done in taffy making may be desirable while the binder is in a warm state (120°–160° F.) so as to modify the texture of the sugar binder.

The fructose-containing matrix may be formed into a thin sheet at room temperature to produce the viscous matrix. In one method, the liquid may be poured into a tray to form a thin viscous layer as it cools. The layer should be less than ¼″ thick, preferably about ⅛″ to 1/16″ thick. The thin layer of viscous melt can also be prepared by feeding the liquid onto a cooling belt where the cooling takes place before a doctor blade scrapes the viscous material onto a continuous belt. Granulated gasified candy is then sprinkled onto the thin sheet of cooled viscous melt. The gasified candy constitutes about 10–40%, preferably 15–30% of the confection. Next, the gasified candy is kneaded into the viscous matrix so that it is coated with the fructose-containing sugar melt to form a mixture of gasified candy dispersed in a binding matrix. This may be accomplished in any of several methods. For example, the thin sheet can be folded over by hand to form a rope which may then be rolled out to the desired thickness. The gasified candy can also be hand kneaded into the sugar melt and then formed into a sheet of the desired thickness by passing it between mechanical rollers. In yet another procedure the sheet of viscous melt containing the gasified candy can be fed to a double screw or double reel extruder which mixes the gasified candy and the viscous melt and produces a sheet of the confection in the desired thickness. Again, where the viscous melt is scraped from a cooling wheel onto a continuous belt and gasified candy is sprinkled theron, ploughs can be used to form a double layer of viscous melt encompassing the gasified candy and to pass it to laminating rolls which produce a sheet of the confection. All of these procedures can produce a thin sheet of confection where the granulated gasified candy is dispersed in and enrobed with the fructose containing binding matrix. This sheet may then be formed into discrete pieces of the confection by scoring, stamping or otherwise molding the sheet to produce the desired shape. One convenient way to do this is to pass the sheet through Drageé forming rolls which score the sheet into square or rectangular "pillows" of the confection. The discrete pieces are permitted to cool at room temperature for several hours to produce a confection of taffy-like consistency. In some instances the confection will cold flow and thus should be packaged promptly to prevent individual pieces from sticking together.

In another embodiment, the taffy-like, gasified candy of the present invention is enrobed with an outer layer of an oleaginous material to produce a product similar to caramel-centered chocolate coated candy bars of the prior art. This coated confection combines a caramel-chocolate flavor with the sizzling and crackling effects of gasified candy, an organoleptic combination not available heretofore in a caramel-like chocolate confection. The oleaginous enrobant may be natural chocolate, a chocolate substitute or pastel.

The natural chocolate may be either sweet or milk chocolate. Sweet chocolate is chocolate liquor to which sugar and cocoa butter have been added. Milk chocolate contains these same three ingredients plus milk or milk solids. Sweet chocolate is available as sweet, semi-sweet or bittersweet chocolate. The chocolate employed here typically contains about 25–45% fat and has a moisture content of about 2.5% or below, more particularly about 1–2% or below.

Appropriate flavoring may be added to the chocolate where a flavored product, such as mint chocolate, is desired.

The chocolate substitute has the physical properties and taste of natural chocolate and is employed in the same fashion as natural chocolate. The principal difference in these products is the substitution of vegetable fats for the cocoa butter of the natural product. The substitute comprises a mixture of vegetable fats, sugars, emulsifiers (for example, soy lecithin) and cocoa powder which imparts a chocolate taste.

Pastel is employed in the confectionary industry in many of the instances where chocolate is employed. It has a texture similar to chocolate and provides substantially the same mouthfeel when eaten. Its composition is similar to sweet chocolate except that milk or milk solids are substituted for the chocolate liquor and other edible fats are substituted for the cocoa butter. Its fat content and moisture content are typically similar to chocolate. Pastel is employed in the present invention to prepare confections with a fruit color and taste by incorporating appropriate colorings and flavorings. By selecting commercially-available products, and incorporating them into the pastel, confections with such flavors as orange, strawberry, cherry, lemon-lime, carbonated beverage flavor, such as cola and the like may be prepared.

The oleaginous enrobant may be applied by any of the well known procedures employed in the confectionary art. For example, the taffy-like confection may be dipped in a vessel of the melted oleaginous material and then removed to a cooling tunnel to harden the enrobant. This operation may be repeated until the desired thickness of oleaginous coating is obtained.

In the above descriptions, gasified candy is described as being admixed with the fructose-surface active agent binding matrix. This was done for purposes of illustration. Those skilled in the art will appreciate that protected compositions containing other edible materials may be prepared in a similar fashion, with appropriate modifications being made where required.

The following examples illustrate embodiments of the invention.

EXAMPLE I

To 61.2 grams of a high fructose syrup (Isomerose 900) in a 400 ml beaker were added 0.25 grams of sodium stearoyl-2-lactylate (Emplex). The mixture was heated to boiling over an electric plate. The emulsifier dispersed easily in the syrup. The mixture was boiled until a temperature of 340° F. was obtained after which the sugar melt was poured onto an aluminum tray. At a temperature of 120° F., the mass was plastic and easly kneaded. 10 grams of gasified candy (gasified with $CO_2$, −14 to +30 U.S. Sieve Series) were folded into the sugar melt and the mixture was kneaded by hand. The mass was lightly pressed into a sheet. Discs were cut from the sheet and some were stored in sealed aluminum pouches. The confection product had a moisture content of 3.4%, by the Karl Fischer method. Taste testing of the confection showed that it was chewable and that it provided a pleasing sizzle. The product in the sealed pouches were stored at 25° C. At the end of two weeks, taste testing showed that the stored product was essentially the same as that which was initially subjected to taste testing and that it had retained its sizzle. The sizzle was still retained after storage for as long as six months.

EXAMPLE II 1170 grams of high fructose corn syrup (Isomerose 900), 50 grams of vegetable fat (Durkee Paramount C hard butter), 5 grams of salt and 5 grams of sodium stearoyl-2-lactylate (Emplex) were heated to 310° F. 50 grams of condensed milk were added when the batch temperature was 290° F. and the mixture was placed in a vacuum chamber for 6 minutes at 29" Hg to achieve a moisture content of 3.4%. 1.5 grams of vanillin and 1.5 grams of artificial caramel flavoring were then added to the sugar melt mixture. The mass was thereafter cooled to 120° F. on a metal table and 430 grams of gasified (carbon dioxide) candy granules (−14 to +30 U.S. Sieve Series) were blended by hand into the taffy-like matrix. The resultant blend was rolled into a sheet and cut into bar shapes.

The product, after equilibration, was slightly more brittle than commercial caramel-taffy products but upon chewing the texture and mouthfeel were similar to the commercial products. The gasified candy produced a pleasing sizzling and crackling sensation.

EXAMPLE III

A confection was prepared in accordance with Example II except that the cooled sugar melt was "pulled" for four minutes before incorporating the gasified candy granules. The pulling appeared to facilitate the mixing of the gasified candy and improved the texture of the final product.

What is claimed is:

1. A confection composition comprising an admixture of:
(a) a sugar melt having a fructose content above 40% by weight dry basis; and
(b) from 0.1 to 5% of a surface active agent selected from the group consisting of stearoyl-2-lactylate, lecithin and mixtures thereof effective to lower the working temperature of the admixture to below 120° F., from 10–40% by weight of granules of gasified candy containing 0.5 to 15 $cm^3$ of gas/gram of gasified candy having a particle size of −4 to +40 U.S. Standard Sieve size, said admixture having a moisture content of below 5%.

2. A confection according to claim 1 wherein the sugar is a corn syrup having a fructose content of at least 80%.

3. A confection according to claim 1 or 2 wherein the admixture additonally contains edible oil and condensed milk.

4. A confection according to claim 3 wherein the edible oil is palm kernel oil.

5. A composition according to claim 1 or 2 wherein the gasified candy comprises 15–30% of the composition.

6. A composition according to claim 1 or 2 wherein the gasified candy contains 2 to 7 $cm^3$ of gas/gram of candy.

7. A composition according to claim 1 or 2 wherein a coating of oleaginous material is formed as an enrobant around the confection.

8. A composition according to claim 7 wherein the oleaginous material is natural chocolate, chocolate substitute or pastel.

9. A method of preparing a confection composition which comprises:
(a) heating, to less than 5% water at 280°–345° F., a liquid admixture of a sugar melt having a fructose content above 40% by weight (dry basis), and 0.5% to 5% of surface active selected from the group consisting of stearoyl-2-lactylate, lecithin and mixtures thereof effective to lower the working temperture of the admixture;
(b) cooing said heated admixture to below about 120° F. to produce a viscous matrix having a moisture content of below 5%;
(c) combining from 10–40% of granules of gasified candy with said viscous matrix whereby the edible material is enrobed; and
(d) forming discrete pieces of protected enrobed edible material.

10. A method according to claim 9, including the following additionaal step:
(e) forming an outer coating of oleaginous material on the enrobed gasified candy.

11. A method according to claim 9 wherein the cooling temperature of step (b) is between 80° to 120° F.

12. A method according to claim 9 wherein the gasified candy has a particle size distribution of −4 to +4 U.S. Sieve Series.

13. A method according to claim 9 wherein the gasified candy comprises 15–30% of the composition.

14. A method according to claim 9 wherein the gasified candy contains 2 to 7 $cm^3$ of gas/gram of candy.

15. A method according to claim 9 wherein the matrix additionally contains edible oil and condensed milk.

16. A method according to claim 15 wherein the edible oil is palm kernel oil.

17. A method according to claim 15 wherein the edible oil comprises about 2 to about 8% and the condensed milk comprises about 2 to about 8% of the matrix.

18. A method according to claim 9 wherein the moisture content of the gasified candy is about 2–3% and of the matrix is about 2–3%.

19. A method according to claim 10 wherein the oleaginous material is natural chocolate, chocolate substitute or pastel.

* * * * *